US008477381B2

(12) United States Patent
Kamei et al.

(10) Patent No.: US 8,477,381 B2
(45) Date of Patent: Jul. 2, 2013

(54) DOCUMENT ADMINISTRATION APPARATUS, DOCUMENT ADMINISTRATION METHOD AND RECORDING MEDIUM

(75) Inventors: Nobuo Kamei, Amagasaki (JP); Takeshi Morikawa, Takarazuka (JP); Kei Shigehisa, Amagasaki (JP); Minako Kobayashi, Ikeda (JP); Masayuki Yoshii, Sakai (JP)

(73) Assignee: Konica Monolta Business Technologies, Inc., Chiyoda-Ku, Tokyo (JP)

( * ) Notice: Subject to any disclaimer, the term of this patent is extended or adjusted under 35 U.S.C. 154(b) by 1701 days.

(21) Appl. No.: 11/896,635

(22) Filed: Sep. 4, 2007

(65) Prior Publication Data

US 2008/0079998 A1 Apr. 3, 2008

(30) Foreign Application Priority Data

Oct. 3, 2006 (JP) ................. 2006-272357

(51) Int. Cl.
*G06K 15/00* (2006.01)
*G06F 3/12* (2006.01)
*G06F 15/16* (2006.01)
*G06Q 50/00* (2012.01)

(52) U.S. Cl.
USPC .......... 358/402; 358/1.14; 358/1.1; 358/1.12; 709/206; 709/200; 705/313; 705/316; 705/718

(58) Field of Classification Search
USPC ............. 358/1.15; 455/412.1; 709/206, 207
See application file for complete search history.

(56) References Cited

U.S. PATENT DOCUMENTS

| 4,470,111 | A  | * | 9/1984  | Jenkins et al. ............... 710/41 |
| 6,567,176 | B1 | * | 5/2003  | Jeyachandran et al. ....... 358/1.14 |
| 6,999,070 | B2 | * | 2/2006  | Jeyachandran et al. ....... 345/419 |
| 7,120,910 | B2 | * | 10/2006 | Matsuda et al. .............. 718/102 |
| 7,299,032 | B2 | * | 11/2007 | Yamada et al. ............. 455/412.1 |
| 7,882,191 | B2 | * | 2/2011  | Sood ............................ 709/206 |
| 2005/0096926 | A1 | * | 5/2005 | Eaton et al. ........................ 705/1 |
| 2006/0195534 | A1 | * | 8/2006 | Isozaki et al. ................. 709/206 |
| 2009/0055489 | A1 | * | 2/2009 | Agarwal et al. ............... 709/206 |

FOREIGN PATENT DOCUMENTS

| JP | 11-184869    | 7/1999 |
| JP | 11-194980    | 7/1999 |
| JP | 2000-172580  | 6/2000 |
| JP | 2002-215543  | 8/2002 |
| JP | 2004-110444 A | 4/2004 |
| JP | 2005-182154  | 7/2005 |

OTHER PUBLICATIONS

Notification of Reasons for Refusal issued in corresponding Japanese Patent Application No. 2006-272357, mailed Oct. 28, 2008, and English translation thereof.

(Continued)

*Primary Examiner* — Akwasi M Sarpong
(74) *Attorney, Agent, or Firm* — Buchanan Ingersoll & Rooney PC

(57) ABSTRACT

A document administration apparatus, comprising: a transmitter to transmit a document to a plurality of destinations; a memory to record status information of said transmitted document therein; and a changer to change status information of said document recorded in said memory, according to an operation by a destination user to whom said document is transmitted.

27 Claims, 16 Drawing Sheets

OTHER PUBLICATIONS

Notification of Reasons for Refusal issued in corresponding Japanese Patent Application No. 2006-272357, mailed Mar. 31, 2009, and English translation thereof.

Notification of Reasons for Refusal issued in corresponding Japanese Patent Application No. 2006-272357, mailed Jun. 23, 2009, and English translation thereof.

* cited by examiner

| User Name | BOX Address | User ID | Password |
|---|---|---|---|
| A | UserA@MFP1 | a | 1234 |
| B | UserB@MFP1 | b | 2222 |
| C | UserC@MFP2 | c | 3333 |
| D | UserD@MFP2 | d | 4545 |
| E | UserE@MFP3 | e | 0011 |
| F | UserF@MFP3 | f | 1111 |

FIG.8

| Document Number | Reply-on Document Number | File Name | Browsing History | Specified Priority Level | Changed Priority Level | Sender User | Destination User |
|---|---|---|---|---|---|---|---|
| 00001 | — | Meeting material | × | 3 | — | A | B |
| 00001 | — | Meeting material | × | 3 | — | A | C |
| 00001 | — | Meeting material | × | 3 | — | A | D |
| 00001 | — | Meeting material | × | 3 | — | A | E |
| 00001 | — | Meeting material | × | 3 | — | A | F |
| 00002 | — | Notice | × | 1 | — | E | B |
| 00002 | — | Notice | × | 1 | — | E | C |

FIG.9

| Document Number | Reply-on Document Number | File Name | Browsing History | Specified Priority Level | Changed Priority Level | Sender User | Destination User |
|---|---|---|---|---|---|---|---|
| 00001 | — | Meeting material | × | 3 | — | A | B |
| 00001 | — | Meeting material | × | 3 | — | A | C |
| 00001 | — | Meeting material | × | 3 | — | A | D |
| 00001 | — | Meeting material | × | 3 | — | A | E |
| 00001 | — | Meeting material | ○ | 1 | — | A | F |
| 00002 | — | Notice | × | 1 | — | E | B |
| 00002 | — | Notice | × | 1 | — | E | C |

FIG.12

| Document Number | Reply-on Document Number | File Name | Browsing History | Specified Priority Level | Changed Priority Level | Sender User | Destination User |
|---|---|---|---|---|---|---|---|
| 00001 | — | Meeting material | × | 3 | — | A | B |
| 00001 | — | Meeting material | × | 3 | — | A | C |
| 00001 | — | Meeting material | × | 3 | — | A | D |
| 00001 | — | Meeting material | × | 3 | — | A | E |
| 00001 | — | Meeting material | × | 3 | — | A | F |
| 00002 | — | Notice | ○ | 1 | 5 | E | B |
| 00002 | — | Notice | × | 1 | — | E | C |

FIG.15

| Document Number | Reply-on Document Number | File Name | Browsing History | Specified Priority Level | Changed Priority Level | Sender User | Destination User |
|---|---|---|---|---|---|---|---|
| 00001 | — | Meeting material | O | 3 | — | A | B |
| 00001 | — | Meeting material | × | 3 | — | A | C |
| 00001 | — | Meeting material | O | 3 | — | A | D |
| 00001 | — | Meeting material | O | 3 | — | A | E |
| 00001 | — | Meeting material | O | 3 | 5 | A | F |
| 00002 | — | Notice | O | 1 | — | E | B |
| 00002 | — | Notice | × | 1 | — | E | C |

FIG.18

| Document Number | Reply-on Document Number | File Name | Browsing History | Specified Priority Level | Changed Priority Level | Sender User | Destination User |
|---|---|---|---|---|---|---|---|
| 00001 | – | Meeting material | ○ | 3 | – | A | B |
| 00001 | – | Meeting material | × | 3 | – | A | C |
| 00001 | – | Meeting material | ○ | 3 | – | A | D |
| 00001 | – | Meeting material | ○ | 3 | – | A | E |
| 00001 | – | Meeting material | ○ | 3 | – | A | F |
| 00002 | – | Notice | ○ | 1 | 5 | E | B |
| 00002 | – | Notice | × | 1 | – | E | C |
| 00003 | 00001 | Re:Meeting material | × | 3 | – | B | A |
| 00003 | 00001 | Re:Meeting material | × | 3 | – | B | C |
| 00003 | 00001 | Re:Meeting material | × | 3 | – | B | D |
| 00003 | 00001 | Re:Meeting material | × | 3 | – | B | E |
| 00003 | 00001 | Re:Meeting material | × | 3 | – | B | F |

FIG.22

DOCUMENT ADMINISTRATION APPARATUS, DOCUMENT ADMINISTRATION METHOD AND RECORDING MEDIUM

This application claims priority under 35 U.S.C. §119 to Japanese Patent Application No. 2006-272357 filed on Oct. 3, 2006, the entire disclosure of which is incorporated herein by reference in its entirety.

BACKGROUND OF THE INVENTION

1. Field of the Invention

The present invention relates to a document administration apparatus that is applied to an image forming apparatus such as a MFP (Multi Function Peripheral) that is a multifunctional digital complex machine, a document administration method, and a recording medium having a document administration program recorded therein to make a computer in the document administration apparatus execute document administration processing.

2. Description of the Related Art

The following description sets forth the inventor's knowledge of related art and problems therein and should not be construed as an admission of knowledge in the prior art.

There is a document administration apparatus having been known for some time, it is such as a MFP wherein a plurality of Boxes that are recording areas prepared in a hard disk and others are allocated for a plurality of respective users, and a document such as image data can be transmitted all at once to the Boxes owned by the respective users. With the conventional document administration apparatus, if a destination user intends to read documents transmitted to his/her own Box to find a plurality of documents in the Box, sometimes he/she is confused about which document to begin with, because he/she has nothing to refer to know which document is more important, which is priority levels of the documents.

Meanwhile, there is another art having been known for some time, it is an e-mail system and others that enable an e-mail to be transmitted with a priority level that is set by a sender.

For example, according to Japanese Unexamined Laid-open Patent Publication No. 2004-110444, an information table is created to be used for judging priority levels of e-mails, and the priority levels are judged with reference to the table, and then a list of the e-mails is displayed in the order of the descending priority levels of the respective received e-mails.

However, it is an issue in the patent publication above that all the documents are anyway needed to be read one by one sequentially, because the priority level set by a sender is in many cases not the same as the one set by a recipient who is a destination user.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide a document administration apparatus that enables not only a judgment by a destination user to be reflected in status information of a transmitted document such as a priority level, but also other destination users of the transmitted document to know the priority level easily.

It is another object of the present invention to provide a document administration method that enables not only a judgment by a destination user to be reflected in status information of a transmitted document such as a priority level, but also other destination users of the transmitted document to know the priority level easily.

It is yet another object of the present invention to provide a recording medium having a document administration program recorded therein to make a computer in a document administration apparatus to execute document administration processing.

According to a first aspect of the present invention is a document administration apparatus, comprising:
- a transmitter to transmit a document to a plurality of destinations;
- a memory to record status information of said transmitted document therein; and
- a changer to change status information of said document recorded in said memory, according to an operation by a destination user to whom said document is transmitted.

According to a second aspect of the present invention is a document administration method, comprising:
- transmitting a document to a plurality of destinations;
- recording status information of said transmitted document; and
- changing status information of said recorded document according to an operation by a destination user to whom said document is transmitted.

According to a third aspect of the present invention is a recording medium having a document administration program recorded therein to make a computer execute:
- transmitting a document to a plurality of destinations;
- recording status information of said transmitted document; and
- changing status information of said recorded document, according to an operation by a destination user to whom said document is transmitted.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 8 is a table showing user administration information stored in the MFP that works as a server on the network;

FIG. 9 is a table showing the Box administration list;

FIG. 12 is a table showing the Box administration list that is updated with a browsing history;

FIG. 15 is a table showing the Box administration list that is updated with the priority level;

FIG. 18 is a table showing the Box administration list that is updated with browsing history;

FIG. 22 is a table showing the Box administration list after a reply is sent on a document;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
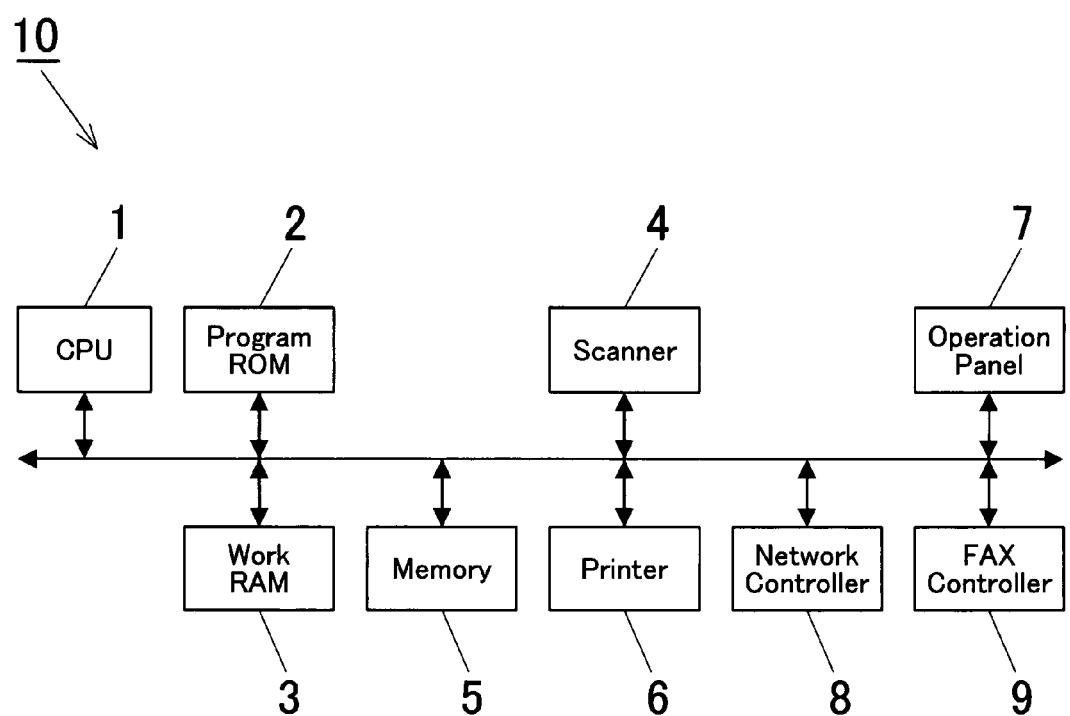
FIG. 1 is a block diagram showing an electrical configuration of a MFP to which a document administration apparatus according to one embodiment of the present invention is applied.

FIG. 1 is a block diagram showing an electrical configuration of a document administration apparatus according to one embodiment of the present invention. In this embodiment, an image forming apparatus, more specifically, a MFP 10 that is a multifunctional digital complex machine, is used as a document administration apparatus.

As shown in FIG. 1, the MFP 10 comprises a CPU 1, a program ROM 2, a work RAM 3, a scanner 4, a memory 5, a printer 6, an operation panel 7, a network controller (NIC) 8, a FAX controller 9 and etc.

The CPU 1 serves not only to control the overall apparatus, but also to administer status information of a document that is transmitted to a plurality of destinations all at once, and to change the status information of the document according to operations by destination users to whom the document is transmitted. The status information is used for the destination users to judge which document should be read or worked on preferentially, and it includes a priority level of the document, information whether or not the destination users have accessed (browsed) the document, and how many times they sent a reply on the document.

Further, the CPU 1 changes the status information of the document, which is set by a sender user, according to an operation by one of the destination users. For example, if the destination user directly inputs his/her preferable status information, then the status information is changed. Otherwise, the number of replies by the destination users is counted, and the status information of the document is changed according to the counted number.

In the present embodiment, a priority level of the document will be explained as an example of the status information of the document.

The program ROM 2 is a memory that stores a program to make the CPU 1 work.

The work RAM 3 is a memory that provides a working area where the CPU 1 works according to the program.

The scanner 4 is a scanner that scans a document placed on a document tray (not shown in Figure) for outputting image data of the document.

Figure 2:
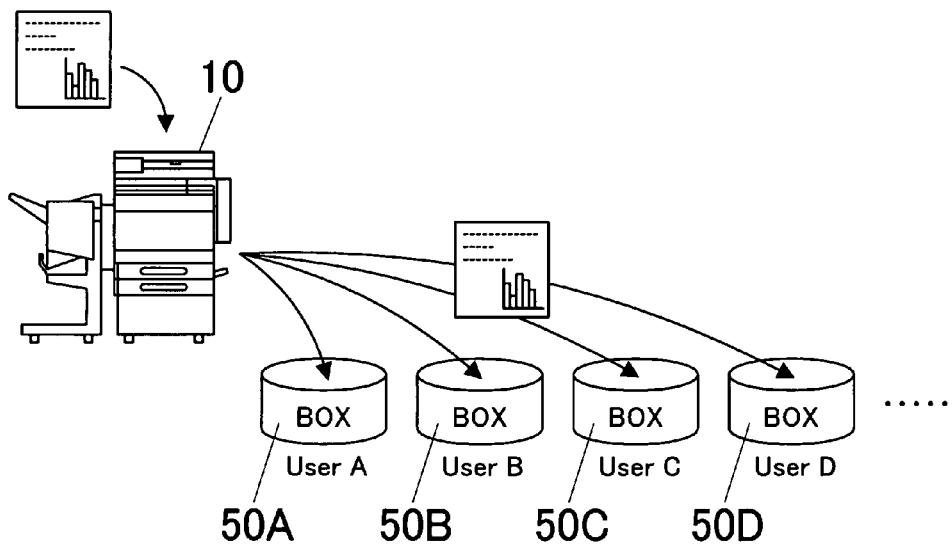
FIG. 2 is a conceptual diagram showing how to store a document in Boxes in the MFP.

The memory 5 serves to store the image data of the document scanned by the scanner 4 and print data transmitted from a user terminal, and etc., and comprises a nonvolatile memory device for example, such as a hard disk drive (HDD). As shown in FIG. 2, there are a plurality of recording areas in the memory 5, and the recording areas correspond to Boxes 50 (50A, 50B, 50C, 50D, and others) owned by respective users. In addition, there is a box administration list recorded in the memory 5, and the respective boxes are administered by the list. Hereinafter, it will be described how to record status information in the box administration list.

The printer 6 serves to print the image data of the document scanned by the scanner 4 and print data transmitted from a user terminal, and etc., according to specified modes.

The operation panel 7 is used for various input operations and others, and comprises a display that will be described below.

The network controller 8 serves to control the communication performed with an external device such as a user terminal that is on a network.

The FAX controller 9 serves to control the communication performed by a FAX function.

FIG. 2 is a conceptual diagram showing how to store a document in the Boxes 50 in the MFP 10.

As shown in FIG. 2, there are the Boxes 50 (50A, 50B, 50C, 50D, and others) in the memory 5, and the Boxes are owned by respective users (Users A, B, C, D, and others). Image data of the document scanned by the scanner 4 is transmitted to a plurality of users, in other words, it is stored in the Boxes 50 (50A, 50B, 50C, 50D and others) owned by the respective users.

Figure 3:
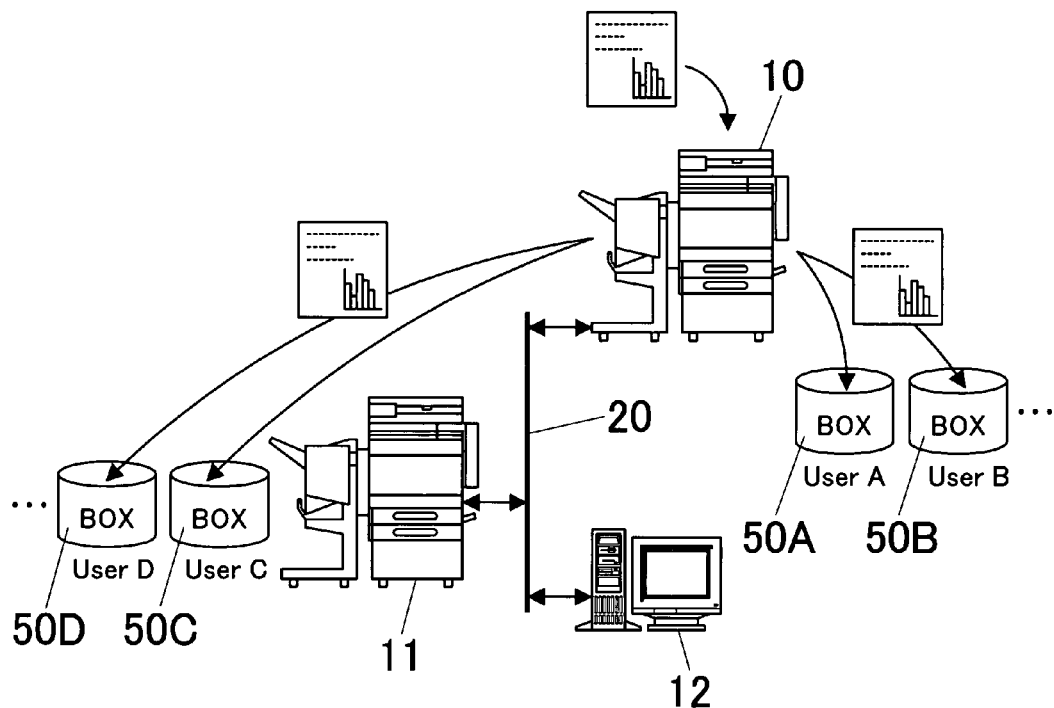
FIG. 3 is a conceptual diagram showing how to store a document in Boxes in a plurality of the MFPs that are on a network.

FIG. 3 is a conceptual diagram showing how to store a document in the Boxes 50 (50A, 50B, 50C, 50D and others) in a case where a MFP 11 that is other than the MFP 10 and a personal computer (referred to also as "PC") 12 are connected to a network 12 in addition to the MFP 10.

As shown in FIG. 3, image data of the document scanned by the scanner 4 is transmitted all at once to the MFP 10 and the MFP 11 that is other than the MFP 10, in other words, is transmitted all at once to the Boxes 50 in both of the MFP 10 and the MFP 11.

Meanwhile, the files in the Boxes 50 (50A, 50B, 50C, 50D and others) can be accessed by an operation from the PC 12 on the network 20, if the PC 20 comprises a similar user interface just like the MFP 10 and the MFP 11.

Figure 4:
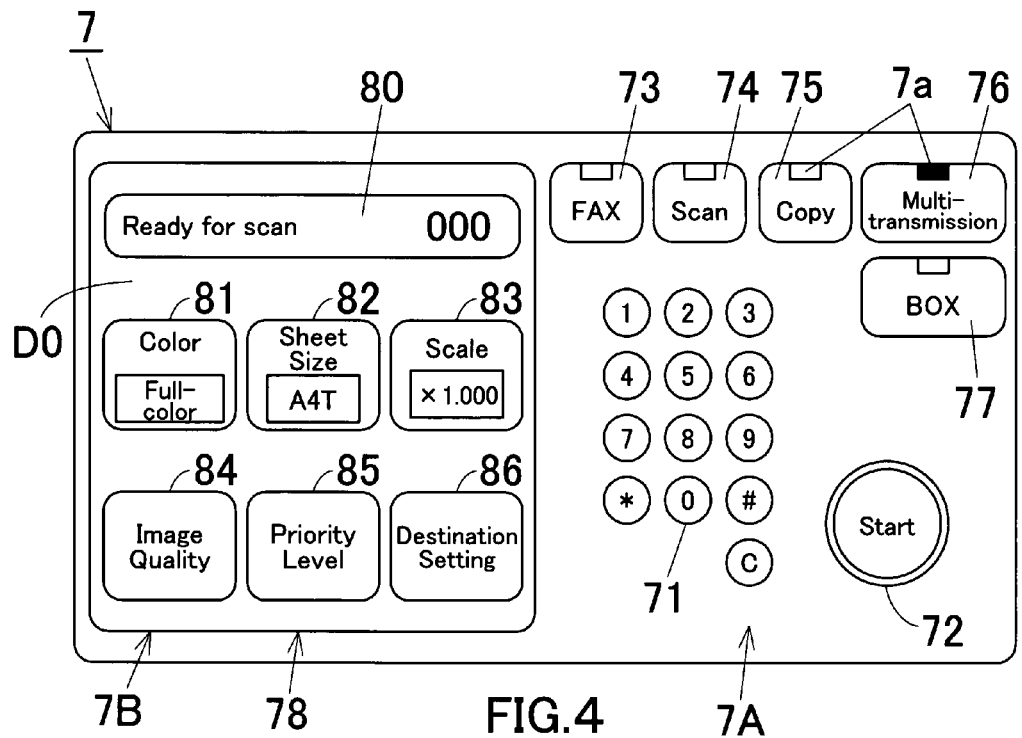
FIG. 4 is a diagram showing a mode selection screen displayed on a display in an operation panel.

FIG. 4 is a diagram showing a mode selection screen D0 displayed on a display 7B in the operation panel 7.

As shown in FIG. 4, the operation panel 7 comprises a keypad 7A and the display 7B.

The keypad 7A comprises mode selection keys such as a "FAX" selection key 73, a "scan" selection key 74, a "copy" selection key 75, a "multi-address transmission" selection key 76 and a "Box" selection key 77, in addition to a numeric keypad 71 and a start key 72, and each of the selection keys 73 to 77 comprises an indicator light (LED) 7a that lights when the key is selected.

The display 7B comprises for example a LCD with a touch panel, and there are buttons displayed on the display 7B, which are used for setting by modes, such as a "color" button 81, a "sheet size" button 82, a "scale" button 83, an "image quality" button 84, a "priority level" button 85, and a "destination setting" button 86, in addition to a message display field 80.

Figure 5:
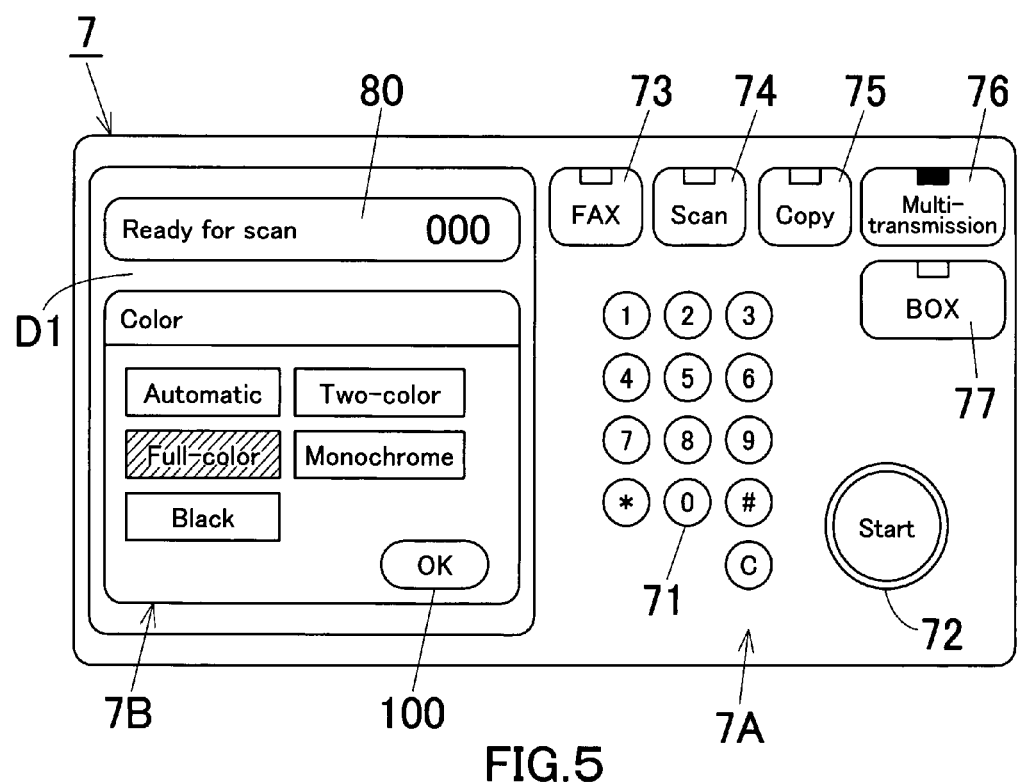
FIG. 5 is a diagram showing a color setting screen that follows the mode selection screen.

In the mode selection screen D0 shown in FIG. 4, if the "multi-address transmission" selection button 76 is selected, multi-address transmission is enabled. Subsequently, if the "color" button 81 is pressed, the screen is switched to a color selection screen D1 shown in FIG. 5, and then a color mode can be set by selecting "full-color" for example (the button marked with hatching as shown in FIG. 5). Then if an "OK" button 10 is pressed in the screen, the screen is back to the mode selection screen D0 shown in FIG. 4.

Figure 6:
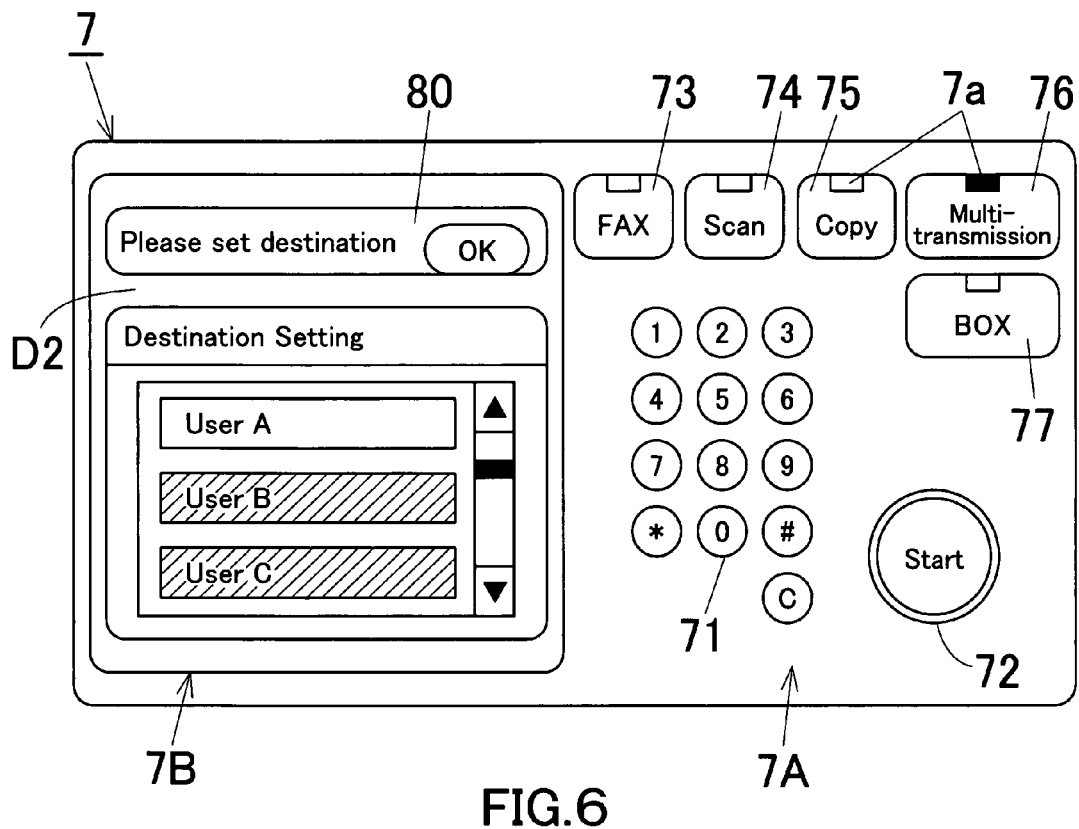
FIG. 6 is a diagram showing a destination setting screen that follows the mode selection screen.
Figure 7:
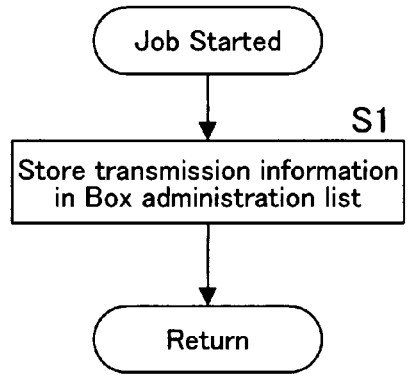
FIG. 7 is a flowchart showing processes to store transmission information in a Box administration list.

In the mode selection screen D0 shown in FIG. 4, if the "destination setting" button 86 is pressed after selecting the "multi-address transmission" selection button 76, the screen is switched to a destination setting screen D2 that is shown in FIG. 6.

In the destination setting screen D2, if some destinations (e.g. the Users B and C) are selected and an "OK" button is pressed, then destination setting is completed. And then, the screen is back to the mode selection screen D0 shown in FIG. 4.

After completion of the settings for multi-address transmission, if a job start key 72 is pressed, a multi-address transmission job is started. Then, the CPU 1 stores transmission information in the Box administration list (Step S1).

The Box administration list is administered and updated by one MFP (for example, the MFP 10) that works as a server on the network 20.

The MFP 10 that works as a server, has user administration information such as destination of Boxes (Box addresses) owned by respective users (the Users A to F), user IDs and passwords as shown in the table in FIG. 8, and a document is stored in the Boxes of the users who are specified in the destination setting process.

If a user who owns the Box 50 intends to access a document stored in the Box 50, the CPU 1 makes a list of the documents displayed on the display 7B with reference to the Box administration list.

FIG. 9 shows an example of the Box administration list.

As shown in FIG. 9, document numbers are given for the respective documents sequentially in the order of transmission when those are transmitted. And there stored by the document numbers in the Box administration list, information such as file names and browsing histories that are made according to operations by users, and the status information of specified priority levels, changed priority levels, sender users and destination users.

In the table, it is assumed that the User A as a sender transmits a file "meeting material" with a specified priority level "3" to the five Users B, C, D, E and F as destination users, on the other hand, the User E as a sender transmits a file "notice" with a specified priority level "1" to the two Users B and C.

Figure 10:
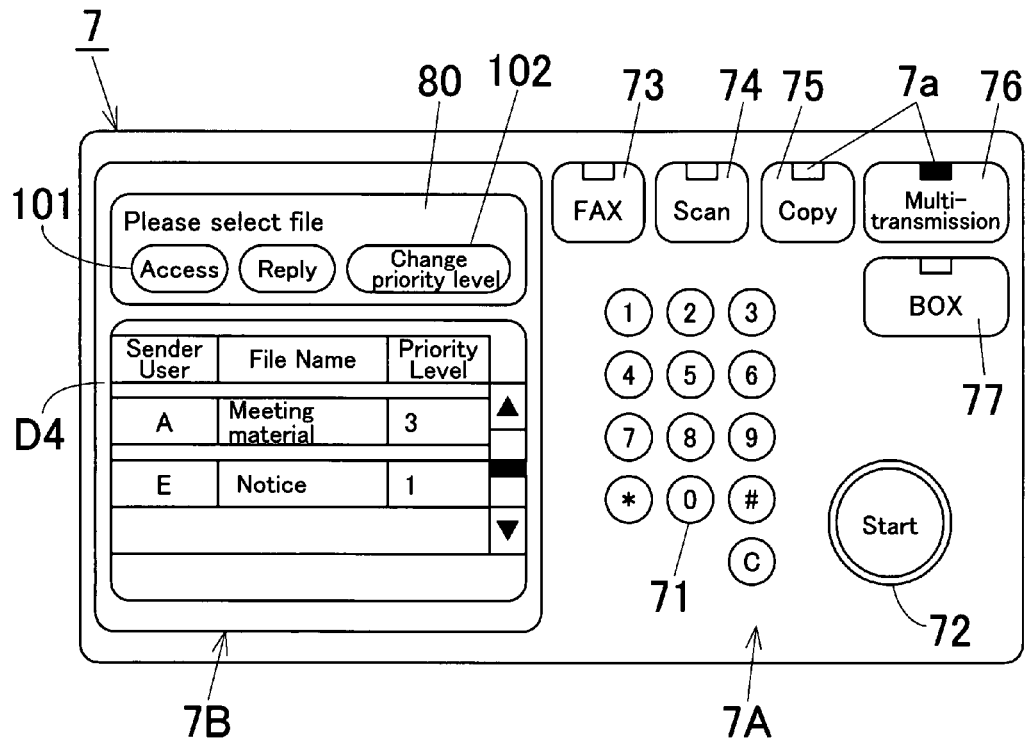
FIG. 10 is diagram showing a document display screen displaying a list of the documents in a Box, and the screen follows the mode selection screen.

In the mode selection screen D0 shown in FIG. 4, if the User B, for example, selects the "Box" selection key 77, the CPU 1 makes a list of the documents in the Box 50B that is owned by the User B, displayed in a document display screen D4 shown in FIG. 10 with reference to the Box administration list.

As shown in the document display screen D4, the document with the file name "meeting material", which is transmitted by the sender user A, and the document with the file name "notice", which is transmitted by the sender user E, are displayed in a list, and priority levels of the respective documents are also displayed.

By selecting a target document and pressing an "access" button 101 in the document display screen D4, the document can be accessed (printed by the MFP 10).

Figure 11:
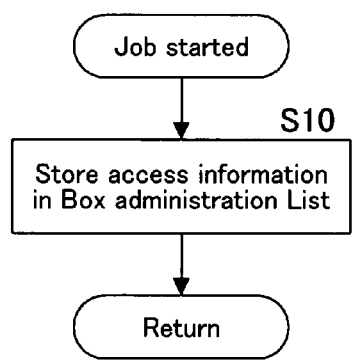
FIG. 11 is a flowchart showing processes to store access information in the Box administration list.

When the document is accessed, access information is stored by the CPU 1 in the Box administration list (Step S10) as shown in FIG. 11, and the Box administration list is updated as shown in FIG. 12.

If the User B makes an access to the document with the file name "notice" which is transmitted by the sender User E, for example, the item "browsing history" in the row of a document number corresponding to the document is updated to "○" as shown in the Box administration list in FIG. 12.

Figure 13:
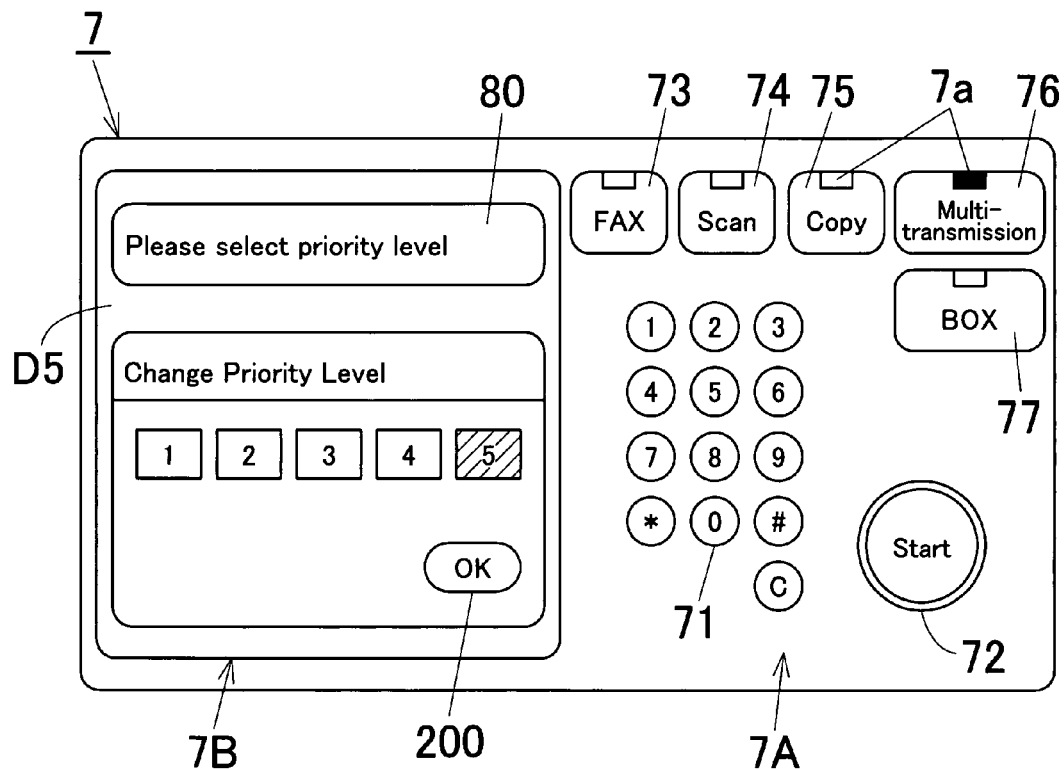
FIG. 13 is a diagram showing a priority level change screen that follows the document display screen displaying a list of the documents in a Box.
Figure 14:
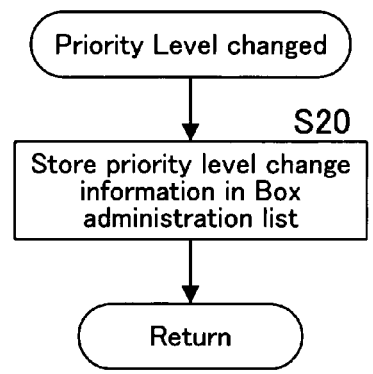
FIG. 14 is a flowchart showing processes to store priority level information in the Box administration list.

In the document display screen D4 shown in FIG. 10, if the User B selects a document and presses a "change priority level" button 102, the screen is switched to a priority level change screen D5 that is shown in FIG. 13.

Thus, the priority level of a document can be changed after making an access to read the document. In this embodiment, the priority level "3" shown in FIG. 10 is intended to be changed to "5" (marked with hatching) shown in the priority level change screen D5 in FIG. 13.

In the priority level change screen D5 shown in FIG. 13, if the priority level "5" is selected and an "OK" button 200 is pressed, priority level change information is stored in the Box administration list by the CPU 1 (Step S20), and the Box administration list is updated as shown in FIG. 15.

In other words, the priority level of the document "notice", which is accessed by the User B, is updated to "5" (larger number indicates higher priority level) as shown in FIG. 15.

Figure 16:
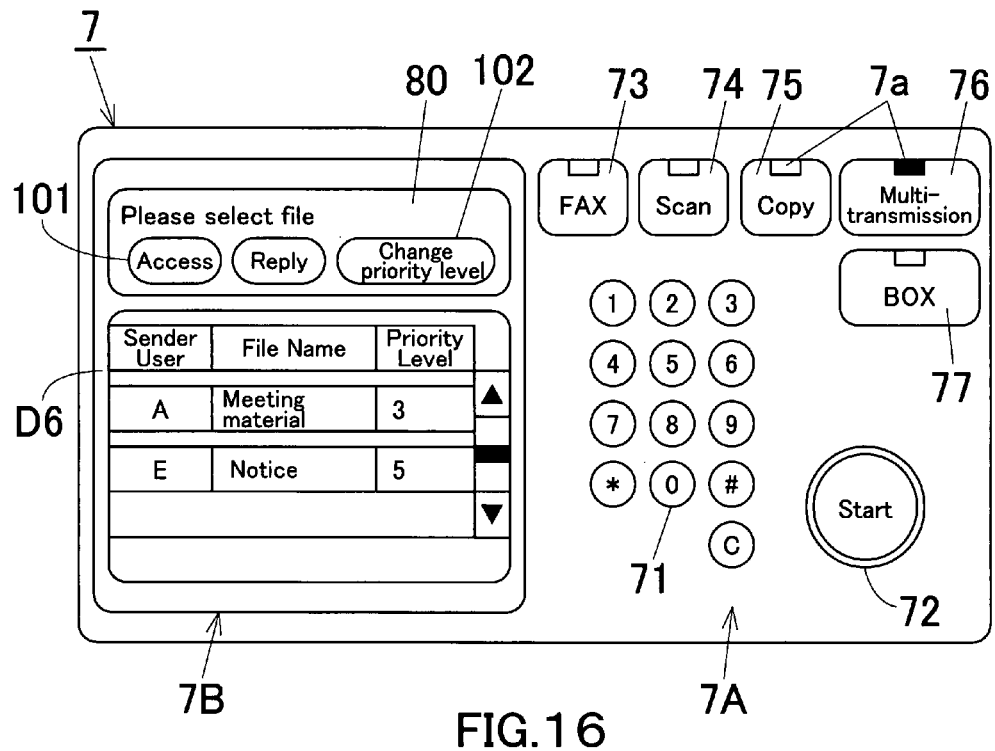
FIG. 16 is diagram showing a document display screen that displays a list of the documents with a changed priority level.

FIG. 16 shows a document display screen D6 that is displayed when a destination user other than the User B (for example, the User C) intends to make a list of the documents in his/her own Box displayed, after the User B changes the priority level.

In the document display screen D6 in FIG. 16, a higher priority level between the one specified by the sender user (the "specified priority level" in the Box administration list) and the one changed by the destination User B (the "changed priority level" in the Box administration list), is displayed. Therefore, in this embodiment, not the priority level "1"

specified by the sender user, but the priority level "5" to which is changed according to the judgment by the destination User B, is displayed.

As described above, not only a judgment by a sender user, but also that by a destination user, are reflected in the priority level of a transmitted document, and this makes it easy for other destination users to read or work on documents in the order of the descending priority levels of the documents.

Figure 17:
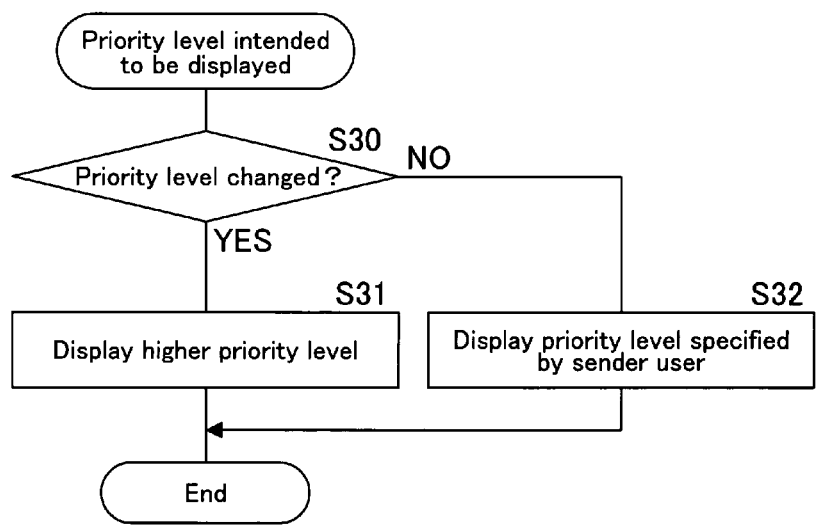
FIG. 17 is a flowchart showing processes to display a priority level.

FIG. 17 shows processes to display the priority level of a document in a Box on the display 7B, when the priority level is changed by a destination user. In Step S30, it is judged by the CPU 1 whether or not the priority level is changed. If it is changed (YES in Step S30), a higher priority level between the one specified by a sender user and the changed one, is displayed in Step S31. If it is not changed (NO in Step S30), the priority level specified by the sender user is displayed in Step S32.

Hereinafter, one embodiment to change the priority level of the document according to browsing histories that are made by destination users, will be explained.

Figure 19:
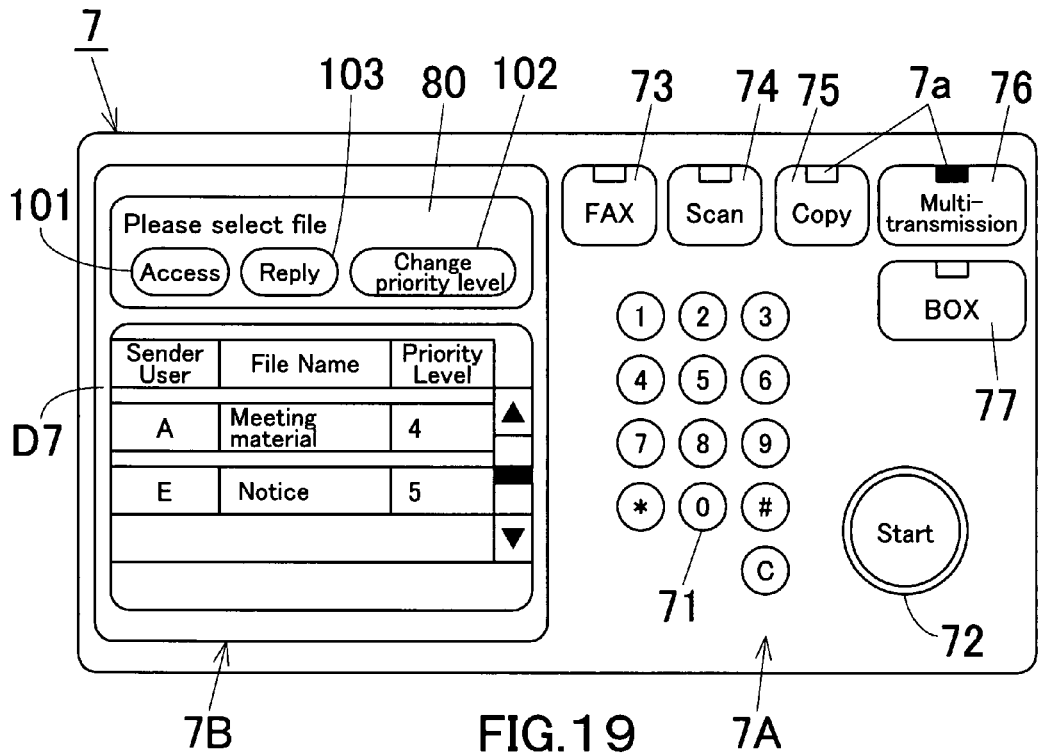
FIG. 19 is a diagram showing a document display screen that displays a list of the documents with a priority level changed according to the browsing history.

This embodiment is to explain how the priority level of the document with the file name "meeting material", is changed and displayed as shown in a document display screen D7 in FIG. 19, when the User C, for example, intends to make a list of the documents stored in his/her own Box, displayed on the display, under the condition where there are in the Box administration list in FIG. 18, the browsing histories made by all the other destination users (the Users B, D, E and F) regarding the document.

As shown in FIG. 18, the priority level "3" is specified for the document with the file name "meeting material". However, the priority level is changed to a higher one "4" according to the browsing histories that are made by the other destination users (the Users B, D, E and F), and the "4" is displayed in the document display screen D7 shown in FIG. 19. In other words, the browsing histories that are made by all the other destination users are reflected in the priority level to be displayed, since it is judged that the priority level of the document should be practically higher. To what level should be changed can be preliminarily set.

As described above, judgments according to which accesses are made by destination users, are also reflected in the priority level of a transmitted document, and this makes it easy for the other destination user (the User C in this embodiment above) to read or work on documents in the order of the descending priority levels of the documents.

Figure 20:
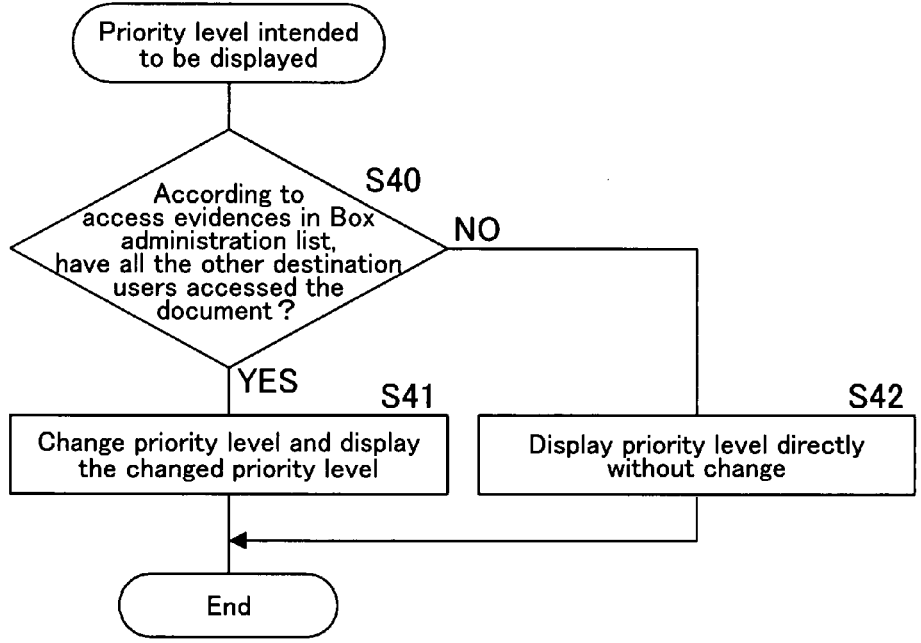
FIG. 20 is a flowchart showing processes to display a priority level with reference to the browsing history.

FIG. 20 shows processes to change according to the browsing histories made by the users, the priority level that is status information of the document in the Box, and display it on the display 7B. In Step S40, it is judged by the CPU 1 from the Box administration list, whether or not all of the other destination users have accessed the document. If all of them have accessed the document (YES in Step S40), the priority level specified by the sender user is changed to a higher one in Step S41. If not all of them have accessed the document, i.e. if even one of them has not accessed the document (NO in Step S40), the priority level specified by the sender user is directly displayed in Step S42. In this embodiment, the priority level is changed under the condition where all of the other destination users have accessed the document. However, the priority level may be changed under the condition where at least one of them has accessed the document. Further, in this embodiment, the priority level is changed when a list of the documents is intended to be displayed. However, the priority level in the administration list may be directly changed to "4" according to the browsing histories of the other destination users.

Hereinafter, one embodiment to change the priority level that is status information of the document according to the number of replies transmitted by operations of destination users, will be explained.

If the User B, for example, selects a document and presses a "reply" button 103 in the document display screen D7 shown in FIG. 19, the screen is switched to a reply screen that is not shown in Figure. This operation for transmitting a reply is similar to that for multi-address transmission.

Figure 21:
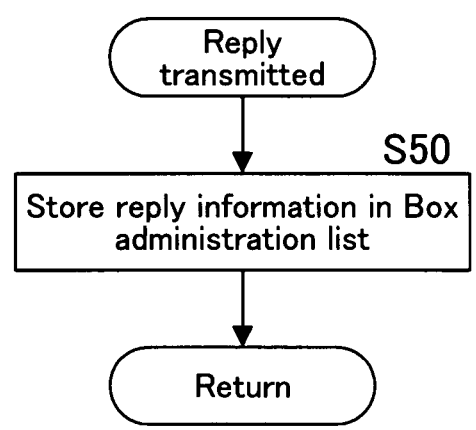
FIG. 21 is a flowchart showing processes to store reply information in the Box administration list.

When a reply is transmitted, reply information is stored by the CPU 1 in the Box administration list (Step S50) as shown in FIG. 21, and the Box administration list is updated as shown in FIG. 22. More specifically, a new document number, and a reply-on document number corresponding to the original document on which a reply is transmitted, are stored in the Box administration list, and the Box administration list is updated.

As shown in the Box administration list shown in FIG. 22, a document with a file name "Re: meeting material" is replied on the original document of a document number 00001, from the User B now as a sender, to the Users A, C, D, E and F now as destination users.

Figure 23:
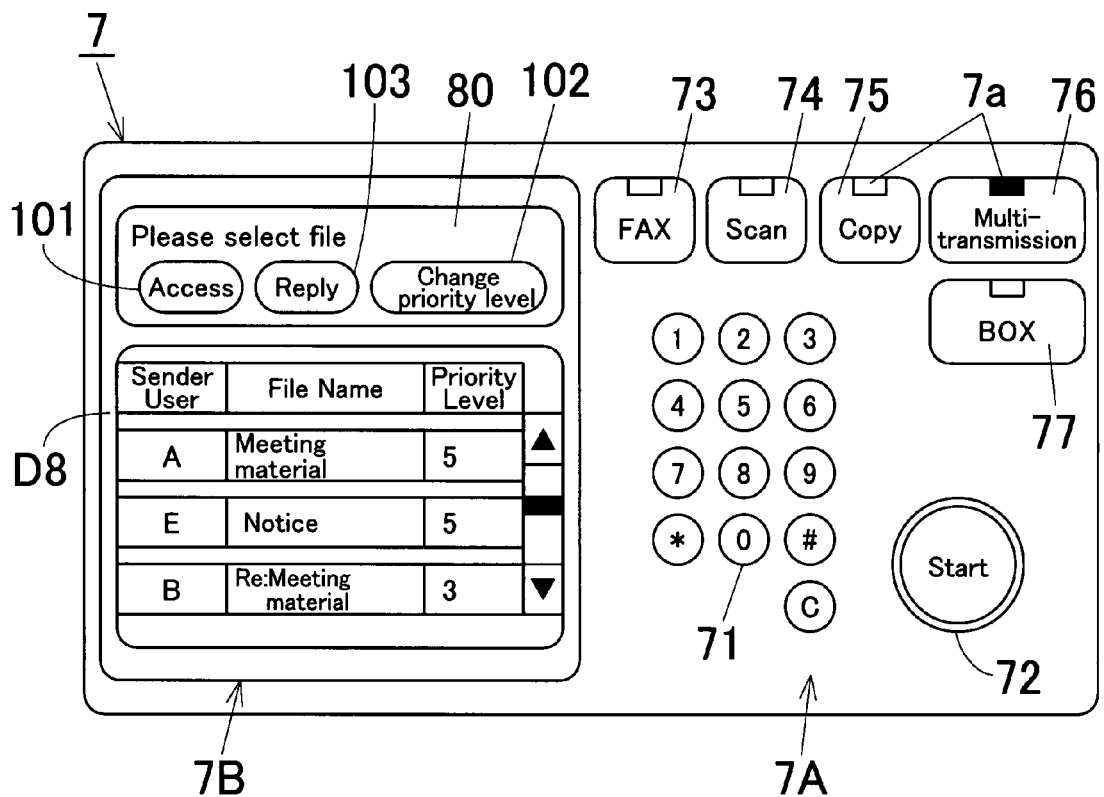
FIG. 23 is a diagram showing a document display screen that displays a list of the documents with a priority level changed according to the number of replies.

FIG. 23 shows a document display screen D8 that displays a list of the documents in a Box when the User C, for example, intends to make it displayed after the User B transmits a reply on the document.

As shown in FIG. 22, the priority level "3" is specified for the document with the file name "meeting material". However, the priority level is changed to "5" as shown in the document display screen D8 in FIG. 23, since the number of replies on the document with the file name "meeting material" exceeds a predetermined number. In other words, it is judged from the larger number of replies that the document should be practically of a higher priority level, and the changed priority level is displayed.

As described above, a judgment according to which a reply is transmitted by a destination user, is also reflected in the priority level of a transmitted document, and this makes it easy for the other destination users to read or work on documents in the order of the descending priority level of the documents.

The number of replies, which is how many times a reply-on document number that corresponds to a document number is stored in the Box administration list shown in FIG. 22, is counted by the CPU 1.

Figure 24:
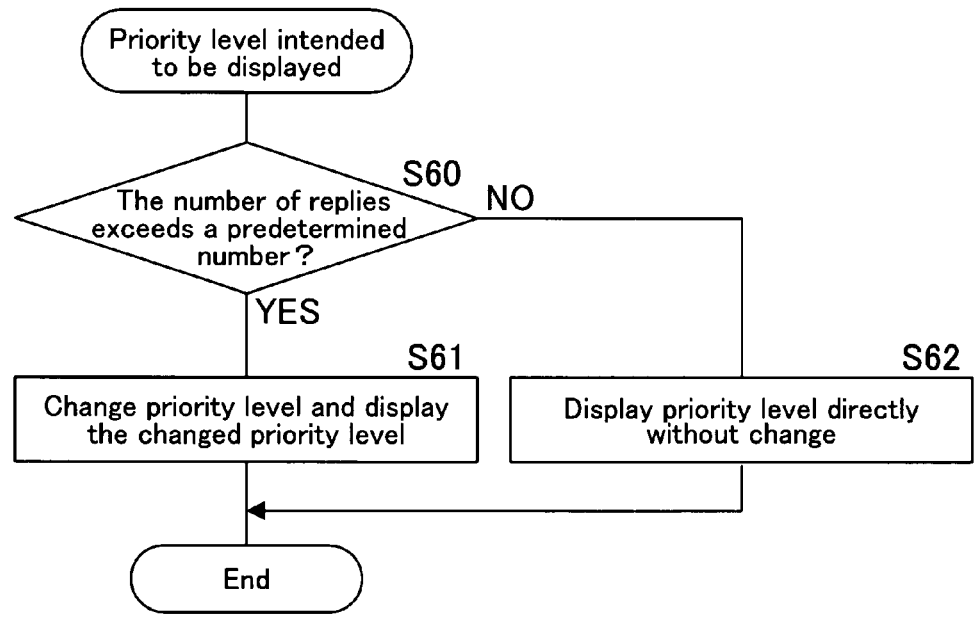
FIG. 24 is a flowchart showing processes to display a priority level with reference to the number of replies.

FIG. 24 shows processes to display the priority level of a document on the display 7B, with reference to the number of replies. In Step S60, it is judged by the CPU 1 from the Box administration list, whether or not the number of replies on the document exceeds a predetermined number. If it exceeds the predetermined number (YES in Step S60), in Step S61, the priority level specified by a sender user is changed to a higher one and the higher one is displayed. If it does not exceeds the predetermined number (NO in Step S60), the priority level specified by the sender user is directly displayed in Step S62.

In this embodiment, the priority level is changed and displayed when a list of the documents is intended to be displayed. However, the priority level in the administration table may be directly changed to "5" according to the number of replies. Otherwise, when a list of the documents is intended to be displayed, whether or not all the destination users have accessed the documents, or the number of replies on the documents, may be displayed as status information.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A document administration apparatus, comprising: a transmitter to transmit a document to a plurality of destinations; a memory to record status information of said transmitted document; a changer to change status information of said document recorded in said memory, according to an operation by a destination user to whom said document is transmitted; and a display that displays a listing of the document transmitted to the plurality of destinations and the status information of the transmitted document, which has been made according to the operation by at least one of the destination users,
wherein the status information is used for the destination user to determine, which documents should be read or worked on preferentially based on a priority level of the document, whether the destination users have accessed the document, and how many times the destination users have sent a reply on the document,
wherein the priority level of the document as shown in the display is a higher priority level between a priority level specified by a sender user and a priority level changed by the operations of the at least one of the destination users.

2. A document administration apparatus as recited in claim 1, wherein said operation by the destination user corresponds to changing the status information of the transmitted document.

3. A document administration apparatus as recited in claim 1, wherein said operation by the destination user corresponds to making an access to the transmitted document.

4. A document administration apparatus as recited in claim 1, wherein said operation by the destination user corresponds to sending a reply on the transmitted document.

5. A document administration apparatus as recited in claim 4, wherein said changer counts the number of replies by the destination user, and changes the status information of said document according to the counted number.

6. A document administration apparatus as recited in claim 1, wherein said status information is priority level.

7. A document administration apparatus as recited in claim 1, wherein said display displays the status information provided by a sender of the documents.

8. A document administration apparatus as recited in claim 1, wherein said changer makes the changed status information recorded in said memory.

9. A document administration apparatus as recited in claim 1, comprises Boxes that are recording areas, each owned by a user, wherein said document is transmitted to the respective Boxes of said destination users.

10. A document administration method, comprising:
transmitting a document to a plurality of destinations; recording status information of said transmitted document;
changing status information of said recorded document according to an operation by a destination user to whom said document is transmitted; and
displaying a listing of the document transmitted to the plurality of destinations and the status information of the transmitted document, which have been made according to the operation by at least one of the destination users,
wherein the status information is used for the destination users to determine, which documents should be read or worked on preferentially based on a priority level of the document, whether the destination users have accessed the document, and how many times the destination users have sent a reply on the document,
wherein the priority level of the document as shown in the display is a higher priority level between a priority level specified by a sender user and a priority level changed by the operations of the at least one of the destination users.

11. A document administration method as recited in claim 10, wherein said operation by the destination user corresponds to changing the status information of the transmitted document.

12. A document administration method as recited in claim 10, wherein said operation by the destination user corresponds to making an access to the transmitted document.

13. A document administration method as recited in claim 10, wherein said operation by the destination user corresponds to sending a reply on the transmitted document.

14. A document administration method as recited in claim 13, wherein said changer counts the number of replies by the destination user and changes the status information of said document according to the counted number.

15. A document administration method as recited in claim 10, wherein said status information corresponds to a priority level.

16. A document administration method as recited in claim 10, wherein said displaying step displays the status information provided by a sender of the document.

17. A document administration method as recited in claim 10, wherein the changed status information is recorded in a memory.

18. A document administration method as recited in claim 10, wherein said document is transmitted to respective Boxes of said destination users, and the Boxes are recording areas.

19. A recording medium that records a document administration program to make a computer execute: transmitting a document to a plurality of destinations; recording status information of said transmitted document;

changing status information of said recorded document, according to an operation by a destination user to whom said document is transmitted; and displaying a listing of the document transmitted to the plurality of destinations and the status information of the transmitted document, which have been made according to the operation by at least one of the destination users, wherein the status information is used for the destination users to determine, which documents should be read or worked on preferentially based on a priority level of the document, whether the destination users have accessed the document, and how many times the destination users have sent a reply on the document, wherein the priority level of the document as shown in the display is a higher priority level between a priority level specified by a sender user and a priority level changed by the operations of the at least one of the destination users.

20. A recording medium as recited in claim 19, wherein said operation by the destination user corresponds to changing the status information of the transmitted document.

21. A recording medium as recited in claim 19, wherein said operation by the destination user corresponds to making an access to the transmitted document.

22. A recording medium as recited in claim 19, wherein said operation by the destination user corresponds to sending a reply on the transmitted document.

23. A recording medium as recited in claim 22, wherein said program makes a computer execute counting the number of replies by the destination user, and changing the status information of said document according to the counted number, in the change step.

24. A recording medium as recited in claim 19, wherein said status information corresponds to a priority level.

25. A recording medium as recited in claim 19, wherein said program makes a computer execute displaying on the display, the status information provided by a sender of the document, in the display step.

26. A recording medium as recited in claim 19, wherein said program makes a computer execute recording the changed status information in a memory.

27. A recording medium as recited in claim 19, wherein said program makes a computer execute transmitting the document to respective Boxes of said destination users in the document transmission step, and the Boxes are recording areas.

* * * * *